(12) United States Patent
Morley et al.

(10) Patent No.: US 6,408,416 B1
(45) Date of Patent: Jun. 18, 2002

(54) DATA WRITING TO DATA STORAGE MEDIUM

(75) Inventors: Stephen Morley; Nigel Kevin Rushton, both of Bristol (GB)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/335,312

(22) Filed: Jun. 16, 1999

(30) Foreign Application Priority Data

Jul. 9, 1998 (EP) .............................. 98305470

(51) Int. Cl.⁷ .............................. G11C 29/00
(52) U.S. Cl. .............................. 714/763
(58) Field of Search .............................. 714/752, 755, 714/758; 369/275.3

(56) References Cited

U.S. PATENT DOCUMENTS

| | | | |
|---|---|---|---|
| 5,305,324 A | 4/1994 | Demos | 714/701 |
| 5,465,260 A | 11/1995 | Zook | 714/758 |
| 5,629,949 A | 5/1997 | Zook | 714/758 |
| 5,974,581 A * | 10/1999 | Nagai | 714/755 |
| 6,092,231 A * | 7/2000 | Sze | 714/758 |

FOREIGN PATENT DOCUMENTS

| | | |
|---|---|---|
| EP | 0363145 A2 | 10/1989 |
| EP | 0694922 A2 | 1/1996 |
| WO | WO91/07744 | 11/1990 |
| WO | WO95/12921 | 10/1994 |

OTHER PUBLICATIONS

European Search Report, EP 98 30 5470, Nov. 10, 1998.

* cited by examiner

*Primary Examiner*—Albert Decady
*Assistant Examiner*—Shelly A Chase (57) ABSTRACT

A method for correcting errors when writing a stream of data to a data, received from a host apparatus, to a magnetic tape data storage medium comprises: partitioning the stream of digital data into a plurality of fragments; writing the plurality of fragments to the data storage medium; reading the plurality of fragments from the data storage medium; checking whether each of the read fragments are correct; assigning each of the correct read fragments to only one of a plurality of groups of fragments; counting a total number of correct read fragments within each of the plurality of groups of fragments; and if the total number of correct read fragments within any of the plurality of groups of fragments is less than the threshold number of correct read fragments then the step of writing the plurality of fragments to the data storage medium is repeated.

17 Claims, 5 Drawing Sheets

DATA WRITING TO DATA STORAGE MEDIUM

FIELD OF THE INVENTION

The present invention relates to writing of data to data storage devices, and particularly, although not exclusively, to a method for assessing the quality of data written using a data storage device to a data storage medium.

BACKGROUND OF THE INVENTION

In order to store digital electronic data it is known to use magnetic tape cartridges comprising a pair of reels which are inserted into a tape drive unit having a plurality of read/write heads. Typically such magnetic tape data storage devices may be used to back up data generated by host devices, eg a computer, or to store data generated by test or measurement instruments.

Typically, conventional tape drive units operate to draw an elongate magnetic tape past a plurality of read/write heads. Tape speeds past the heads are relatively slow, of the order of a few centimeters per second. In tape based magnetic data recording systems, data may be recorded using a plurality of write heads and read with a plurality of read heads. Conventionally, these write and read heads may be either substantially stationary with respect to the rest of the device, in which case, data are stored in a plurality of tracks parallel to the elongate direction of the tape, or the write or read heads may be mounted on a drum which is rotated about an axis which is transverse to a direction of movement the tape, resulting in data which is stored in a series of tracks written side by side diagonally across the width of the magnetic tape, the diagonal tracks laying in parallel to each other along the length of the tape.

During the process of writing to the magnetic data storage media, the data can become corrupted for a number of reasons as follows:

Non-uniform coating of the tape with magnetic material;
Scratches or other damage to the magnetic coating of the data storage medium;
Dust or other particulate matter becoming temporarily trapped between a recording head and the data storage medium during the processes of reading or writing data to the data storage medium.

In conventional tape drives, it is known to incorporate electronic circuitry to encode the digital data to be stored prior to writing to tape, using an algorithm which adds error correction bits to the original digital data. The error correction bits contain information from which parts of the original data may be reconstructed if they have become corrupted during the process of writing to the data storage medium. It is known to monitor the quality of the data written to the data storage medium during the write process. If the written data has a number of corrupt bits of data that are greater than can be corrected for using the error correction bits, then the data is re-written to the data storage medium.

In order to maximise the storage capacity of a data storage medium and to minimise read and write times, for assessing the data storage medium it is important to reduce, as far as possible, the quantity of data that needs to be re-written to the data storage medium, in other words, it is important to maximise the tolerance to errors for a given degree of error correction coding of the data.

SUMMARY OF THE INVENTION

Specific embodiments and methods according to the present invention aim to improve the tolerance to errors in high data storage density tape systems, and thereby reduce the amount of data to be rewritten to tape, hence improving the storage capacity and access times of such devices.

According to one aspect of the present invention, a data stream is partitioned into a plurality of data blocks referred to herein after as fragments.

According to a first aspect of the present invention, there is provided a method of writing a stream of digital data to a data storage medium, characterized by-comprising the steps of:

partitioning said stream of digital data into a plurality of fragments;
interleaving an error correction code between individual ones of said fragments; and
partitioning a plurality of said fragments together into a plurality of groups of fragments, a grouping of said groups being determined according to said interleave.

Preferably, said plurality of fragments contain a same number of bits of data as each other.

According to a second aspect of the present invention there is provided a method for writing a stream of data to a data storage medium using a data storage device characterized by comprising the steps of:

partitioning said stream of digital data into a plurality of fragments;
writing said plurality of fragments to said data storage medium;
reading said plurality of fragments from said data storage medium (904);
checking whether each of said read fragments are correct (905);
assigning each of said correct read fragments to only one of a plurality of groups of fragments (907);
counting a total number of correct read fragments within each of said plurality of groups of fragments (909, 911, 913); and
if said total number of correct read fragments within any of said plurality of groups of fragments is less than a threshold number of correct read fragments, then repeating said step of writing said plurality of fragments to said data storage medium (915).

This method may significantly increase the tolerance to errors introduced during the process of writing data to a data storage medium.

Preferably said plurality of fragments contain a same number of bits of data.

Preferably said plurality of fragments contain bits of data for correcting errors in said fragments.

Preferably a first number of said bits of data for correcting errors in said fragments comprise a first Reed-Solomon cyclic redundancy code.

Preferably a second number of said bits of data for correcting errors in said fragments comprise a second Reed-Solomon cyclic redundancy code.

A said step of assigning each of said correct read fragments of only one of a plurality of groups of fragments, comprises the steps of:

determining a number of a correct read fragment within said plurality of fragments;
if said number of said correct read fragments is defined by a first equation, then said correct read fragment is assigned to a first group of fragments;
if said number of said correct read fragments is defined by a second equation, then said correct read fragment is assigned to a second group of fragments; and if said number of said correct said read fragments is defined by a third equation, then said correct read fragment is assigned to a third group of fragments.

Preferably said first equation is:

$$\text{fragment number} = 0 + (N \times 3),$$

where N is an integer number and may take any value in a contiguous range of integer numbers from 0 to 31.

Preferably said second equation is:

$$\text{fragment number} = 1 + (N \times 3),$$

where N is an integer number and may take any value in a contiguous range of integer numbers 0 to 31.

Preferably said third equation is:

$$\text{fragment number} = 2 + (N \times 3),$$

where N is an integer number and may take any value in a contiguous range of integer numbers from 0 to 31.

Said data storage medium may comprise a magnetic tape or a magnetic disk. In the best mode described, the method is applied to a magnetic tape.

According to a second aspect of the present invention there is provided a data storage device for writing a stream of data to a data storage medium characterised by comprising:

a means for partitioning said stream of data into a plurality of fragments (810);

a means for writing said plurality of fragments to said data storage medium (810, 102, 201, 203);

a means for reading said plurality of fragments from said data storage medium (102, 202, 204);

a means for identifying correct fragments (801);

a means for identifying a position of said correct read fragments within said plurality of fragments (803);

a means for assigning said correct read fragments to only one group of a plurality of groups of fragments;

a plurality of means for counting a number of said correct read fragments (804–806); and a means (810, 102, 201, 203) for causing said plurality of fragments to be re-written to said data storage medium if said number of said correct read fragments within any of said plurality of groups of fragments is less than a threshold number of correct read fragments.

Preferably said means for causing said plurality of fragments to be rewritten to said data storage medium comprises a microprocessor.

Preferably said data storage medium is a magnetic tape. Said data storage medium may be a magnetic disk.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Specific methods according to the present invention as described herein, may be particularly suited to magnetic tape recording devices having a plurality of rotating read and/or write heads, in which an elongate tape is drawn past the heads and the read and/or write heads rotate about an axis aligned at an angle to the direction of the tape motion. However, it will be understood by those skilled in the art that the methods disclosed herein are not restricted to data recording devices having rotating heads or to data storage media comprising an elongate tape. The generality of the present invention described herein is limited in scope only by the essential features according to the claims herein.

Figure 1:
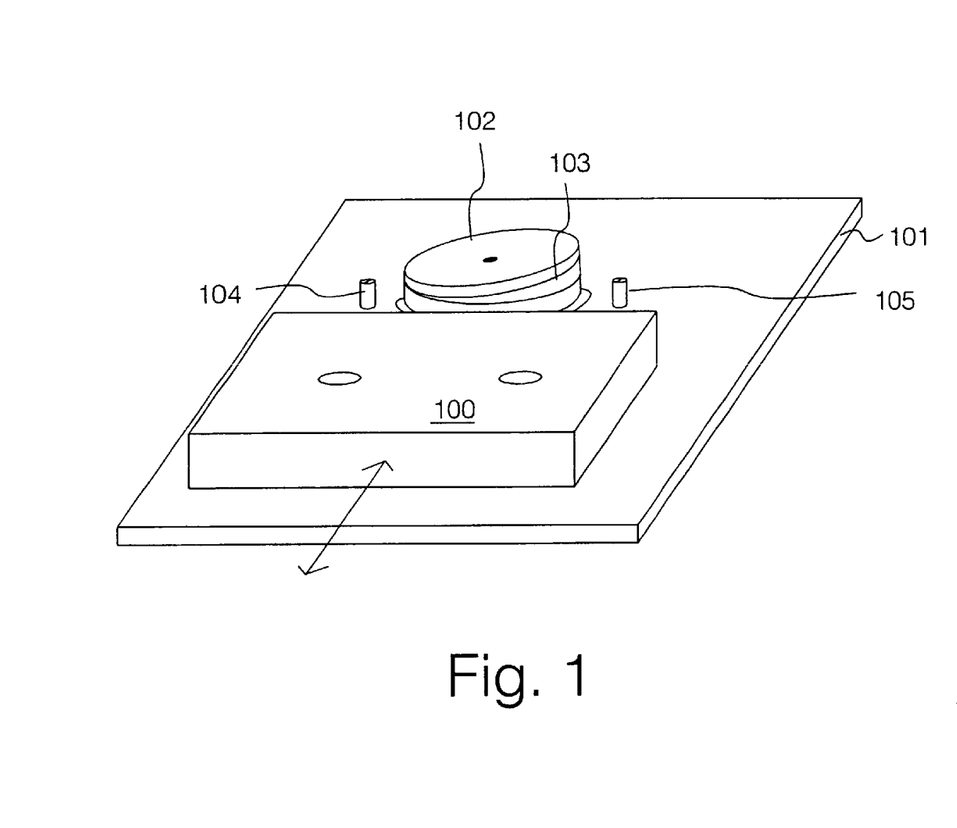
FIG. 1 illustrates features of a data storage device and magnetic tape data storage medium contained within a removable cassette according to a specific embodiment of the present invention.
Figure 2:
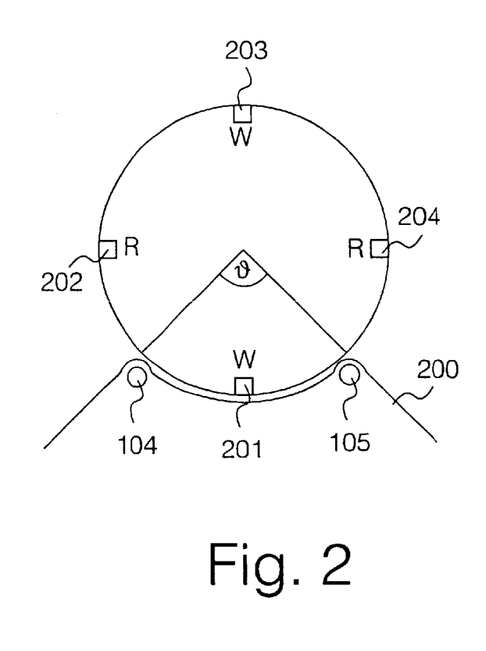
FIG. 2 illustrates relative positions of a plurality of recording heads and reading heads mounted on a rotating drum at one instant during rotation of the drum past an elongate band of magnetic tape data storage medium.
Figure 3:
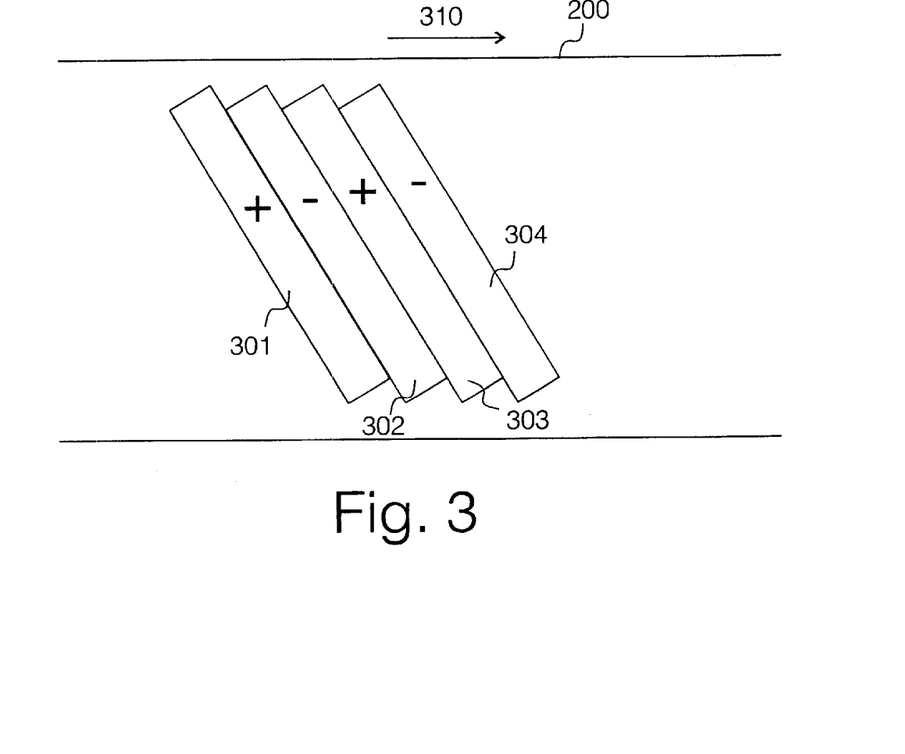
FIG. 3 illustrates schematically a physical path layout of a sequence of data tracks recorded diagonally across the elongate tape by the record heads mounted on the rotating drum.

Referring to FIGS. 1 to 3 herein, there are illustrated features of a magnetic tape data storage system according to a best mode for carrying out the present invention. The system comprises a data storage device having a rotating drum read/write head 102 mounted on a base plate 101; a plurality of guide rollers 104, 105 for guiding an elongate magnetic tape band past the rotating read/write head 102; a tape cassette 100 comprising a housing and a pair of tape storage reels and a band of elongate magnetic tape data storage medium. For clarity, the magnetic tape has been omitted from this figure. The elongate band of magnetic tape data storage medium, onto which data are written, is stored within cassette housing 100 and the elongate tape is wound onto reels permanently located within cassette 100. The elongate tape and cassette housing are configurable to be removed and permanently stored away from the data storage device. In the normal operation of the data storage device a loop of the magnetic tape is drawn out of the cassette 100 and is held in close contact with a curved surface of the cylindrical rotating drum 102 by guide rollers 104 and 105. Rotating drum 102 is mounted on a fixed plinth 103 so as to be able to rotate freely about its axis. Fixed plinth 103 is mounted on base plate 101, such that the main axis of rotation of the drum lies at an angle transverse to a main plane of base plate 103 and offset from a line perpendicular to the main plane. The elongate tape is drawn across the rotating drum such that a direction of travel of the read and write heads is transverse to a direction of travel of the tape, resulting in written data tracks which extend across a width of the tape and along a length of the tape, extending in substantially straight lines diagonally across the tape. Rotating drum 102, fixed plinth 103, guide rollers 104 and 105 and base plate 101 are all permanently located within the magnetic data storage device. Mounted on the rotating drum 102 are the magnetic read and write heads according to the best mode described herein.

Referring to FIG. 2 herein, there is illustrated schematically the relative positions of the write heads 201 and 203 and the read heads 202 and 204 on drum 102. In use, the elongate magnetic tape 200 is wrapped around part of the circumferential curved surface of the rotating drum 102, the tape being held in position in contact with the drum by guide rollers 104 and 105. An angle subtended at the axis of rotation of the drum over which the elongate magnetic tape 200 is substantially in contact with the curved surface of the rotating drum 102 is known as the wrap angle (θ) and, according to the best mode described herein, is preferably of the order 90°. The location of the read and write heads distributed around rotating drum 102 and the wrap angle of the elongate magnetic tape 200 are configured such that only one read head or one write head is in contact with the elongate magnetic tape 200 at any instant during normal operation of the data storage device.

Referring to FIG. 3 herein, there is illustrated schematically a physical layout of data tracks recorded onto elongate magnetic tape 200 by the rotating write heads 201 and 203. According to the best mode described herein, the elongate magnetic tape 200 is drawn past the drum 102 at a relatively slow tape speed of the order a few centimeters per second. In contrast, the rotating drum 102, on which are mounted the read and write heads 201 to 204, is rotating at typically a few thousand revolutions per minute, so the relative speed of the read and write heads to the drum is orders of magnitude greater than the absolute tape speed.

During a write operation one of the write heads 201 and 203 records a track diagonally across the elongate tape 200. The width of the track recorded is typically, 6.3 µm, whereas the width of the elongate tape is typically 4 millimeters. In order to maximize the density of tracks recorded on tape, the linear tape speed is set to a value that ensures that each subsequent track recorded on tape partially records over an edge of the previously recorded track. As the tape is drawn slowly past the rotating drum 102 the write heads 201 and 203 successively write a series of diagonal tracks 301 to 304 across the tape.

Whilst the specific methods described herein are applied in the best mode in a tape data storage device as described above, the generality of the invention and the underlying inventive concepts are equally applicable to tape data storage devices in which tracks are recorded in parallel to the length of the tape.

The stream of digital data to be recorded onto elongate magnetic tape 200 is logically partitioned in a series of data blocks of fixed length. Each physical track, 301 to 304, recorded onto tape comprises a fixed number of logical data blocks. According to the best mode described herein, each track comprises 96 logical data blocks having a same, fixed logical length.

The relative locations of the write heads and read heads on the rotating drum 102 results in a significant delay between a time at which a track is written to tape and when it is subsequently read back from tape. By way of example, there is illustrated in Table 1 the order in which a contiguous series of frames, where one frame comprises two adjacent tracks, are written to tape and subsequently read back from tape. The "+" symbol and the "−" symbol indicate the positive and negative azimuth tracks within a given frame.

TABLE 1

| Read (R) or Write (W) | Frame Number |
| --- | --- |
| W | +100 |
| R | +97 |
| W | −100 |
| R | −97 |
| W | +101 |
| R | +100 |

Figure 4:
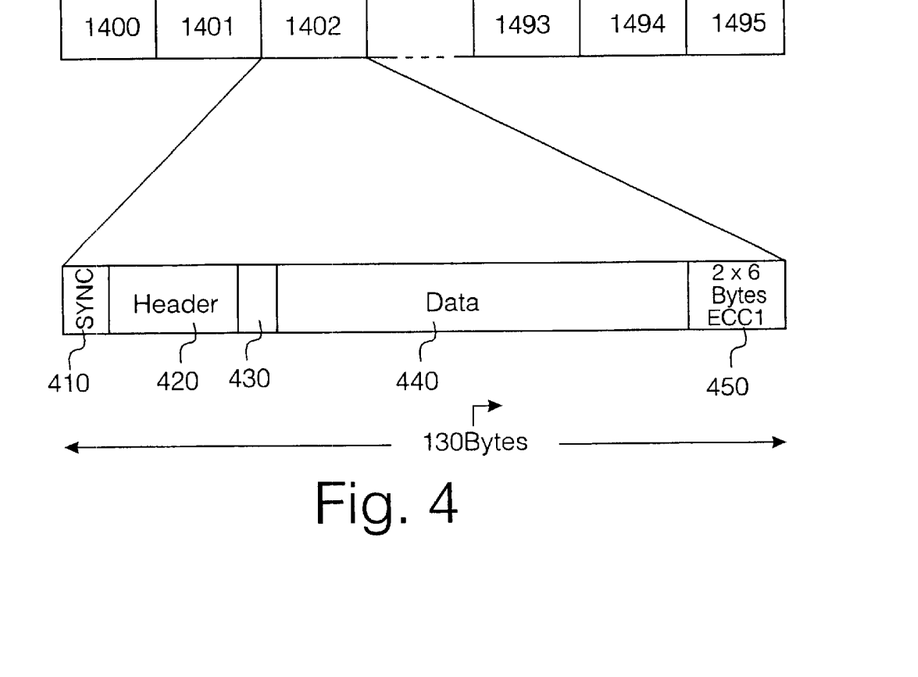
FIG. 4 illustrates schematically a logical track format comprising a sequence of logical data fragments which are written to magnetic tape and also shows in more detail a content of one particular such fragment.

Referring to FIG. 4 herein, there is illustrated schematically a sequence of logical data blocks with the contents of one such data block shown in more detail. A fixed length logical data block is also known herein as a "fragment". Each physical track, of which tracks 301 to 304 are examples, recorded diagonally across the magnetic tape 200 comprises 96 fragments 1400–1495. Each fragment is 130 bytes in length and comprises the following fields:

Synchronization field 410—this field comprises a predetermined sequence of bits which are used to identify the start of a fragment;

Header field 420—this field contains information which uniquely identifies the fragment. In particular, the header field contains information concerning the number of the track which contains the fragment and the number of the fragment within a given track. During a read operation, the header parity field is used to ensure that the information contained within the header field has not been corrupted. If the header field has been read correctly, then the remaining fields of the fragment are checked;

Parity field 430—a parity bit provides a check on the integrity of the data contained within the header field;

Data field 440—the data field comprises two streams of contiguous digital data having a same length. The data is organized in the data field such that a zeroth byte of data from the first stream of data is followed by a zeroth byte of data from the second stream of data and continuing in a like manner wherein an nth byte of data from the first stream of data is followed by the nth byte of data from the second stream of data, where n+1 is the number of bytes of data in the first or second data streams. This process of combining first and second data streams of equal length is known herein as "interleaving";

Error correcting parity bytes 450—in order to detect and correct errors of the size of a few bytes in the data streams discussed above, each data stream has 6 error correcting parity bytes appended onto the end of it. The error correcting parity bytes are generated using a Reed-Solomon cyclic redundancy code. The error correcting parity bytes associated with the two streams of data are interleaved.

According to the best mode described herein, there are three levels of error correction applied to the digital data prior to recording on to the magnetic data storage medium. The first level of error correction applied to the data are the 2×6 bytes of error correcting parity bytes 450 which are also known herein as error correction code 1 (ECC1) parity bytes. The two interleaved streams of data and ECC1 parity bytes are known herein as 'interleaved ECC1 codeword pairs'. The interleaved ECC1 codeword pairs can correct for random errors of up to a few bytes in length. However, where a larger number of continuous bytes of data are affected by, for example a flaw in the recording medium, then the interleaved ECC1 codeword pairs cannot correct for this. Flaws in the recording medium can introduce errors in the data read back from tape of the order of one to two fragments in length. Larger errors which are also known herein as 'burst' errors can be corrected by applying a second level of error correction coding (ECC2 coding) to the digital data prior to writing the data to the magnetic tape.

Prior to writing data to the magnetic tape the interleaved ECC1 codeword pairs are formed into a series of ECC2 codewords. The ECC2 codewords are formed by taking a first byte from a first fragment, the first fragment being a first pair of interleaved ECC1 codewords as described herein before, and appending on to the end of the first byte of data from the first fragment, a first byte of data from a fourth fragment and in a like manner taking a first byte of data from the seventh fragment and similarly taking the first byte of data from every third successive fragment up to and including a ninety fourth fragment. Similarly, a second ECC2 codeword is formed by taking the second byte of data from the first, fourth, sixth, seventh, etc, up to ninety fifth fragments which comprise one track. In a similar fashion, a second set of ECC2 codewords are formed by taking, for example, a first byte of data from each of the first, fourth, seventh, etc, up to the ninety fourth fragment and appending six error correcting parity bytes yielding an ECC2 codeword. In a similar fashion, an ECC2 codeword is formed from taking a second byte of data from the second, fifth, eighth, . . . , up to the ninety fifth fragments. That is to say, in general an $n^{th}$ codeword of a group of codewords is formed by taking the $n^{th}$ byte of each of the 3m+1 fragments where m=0 to 33.

Figure 5:
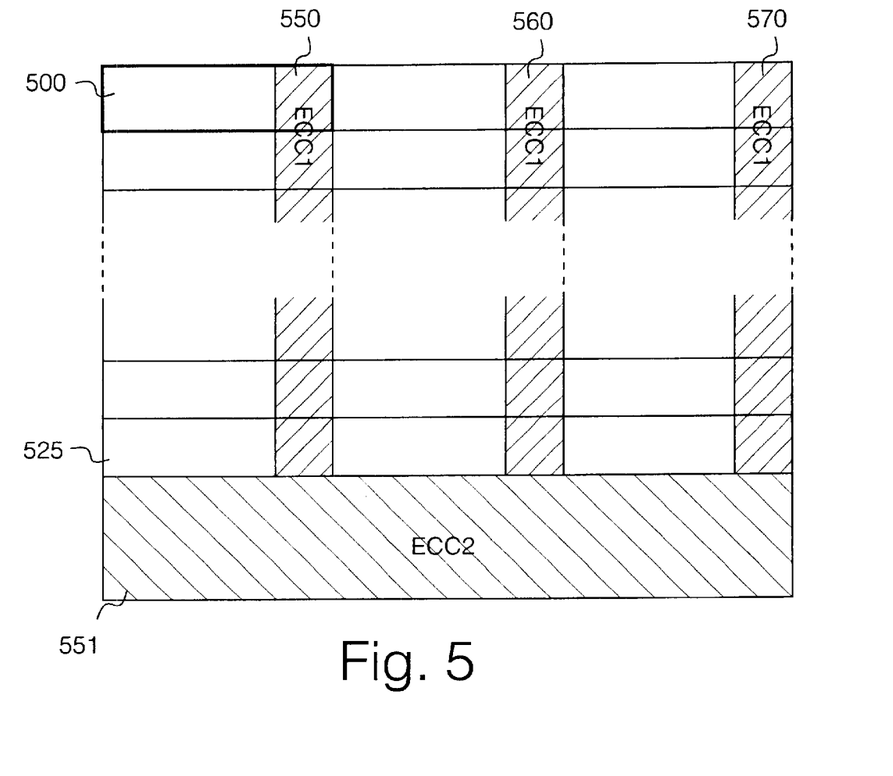
FIG. 5 illustrates the fragments comprising one track arranged in a two dimensional array in order to generate ECC2 code words.

Referring to FIG. 5 herein, there is illustrated schematically a logical arrangement of the fragments comprising one physical track within a memory buffer indicating how the ECC2 codewords are orthogonal to the ECC1 interleaved codeword pairs.

The ninety six fragments comprising one track are arranged into a memory buffer, the logical arrangement of the fragments within the memory buffer having three columns and thirty two rows. The fragments are arranged such that the zeroth fragment of a track is written to a zeroth position 500 being the zeroth row and zeroth column of the array. In a like manner, the first fragment of the track is written to the zeroth row and zeroth column of the array. The array is filled in a like manner with the contiguous sequence of fragments with the ninety fifth fragment is written to the thirty second row and second column of the array.

A single ECC2 codeword is formed by taking a same corresponding byte from a single column of the array. To illustrate this, by way of example, the first ECC2 codeword is formed by taking the first byte from each of the fragments occupying rows 500 to 525 in the array. Appended on to the end of the 26 bytes of data comprising the zeroth column are six ECC2 parity bytes.

Figure 6:
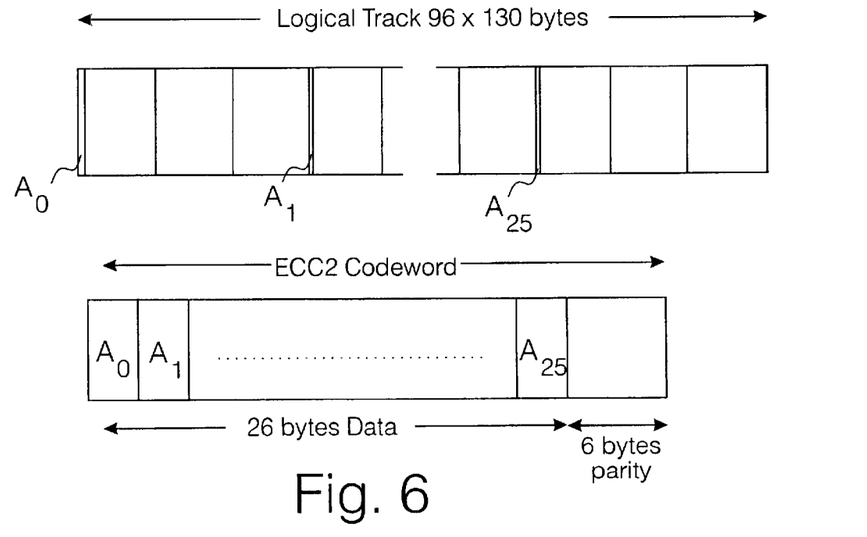
FIG. 6 illustrates how ECC2 code words are constructed from corresponding bytes from every third fragment.

Referring to FIG. 6 herein, there is illustrated schematically one track comprising ninety six fragments, each fragment being one hundred and thirty bytes in length. The first ECC2 codeword is formed by taking the first byte $A_0$ from the zeroth fragment, the first byte $A_1$ of the third fragment and in a like manner finally taking the first byte $A_{25}$ from the ninety third fragment. This yields an ECC2 codeword comprising twenty six bytes of data $A_0$ to $A_{25}$ and six ECC2 parity bytes.

The ninety six fragments containing data, ECC1 parity bytes and ECC2 parity bytes contain redundant information from which individual bytes of data and entire fragments can be reconstructed.

The integrity of data written to tape may be checked by reading the data back from tape a short time interval after it has been written to tape and assessing the quality of the written data. A delay between writing the track by a write head, and reading the track by a read head is typically of the order 16 ms, as is implicit in Table 1 herein. However, checking each byte of data written would necessitate incorporating read channels with high band width and large capacity memory buffers to accommodate the high rate at which data is read back from tape. In order to minimise the costs and complexity involved in checking data, it is possible to apply a much more limited quality assessment to the written data. One such limited quality assessment is to check whether the ECC1 parity bytes associated with an interleaved ECC1 codeword pair comprises one fragment indicating that the data associated with the interleaved ECC1 codeword pair are not corrupted. An interleaved ECC1 codeword pair is considered to be recoverable if the parity bytes of either of the interleaved codewords indicate that the data associated with one of the interleaved codewords is not corrupted.

In the prior art method, having determined whether an individual fragment is 'good' which is taken to mean herein whether the data contained within the fragment is not corrupted, if the number of 'good' fragments can be counted. If the number of good fragments within one track is below a pre-determined threshold value then the entire track comprising ninety six fragments is rewritten to tape.

Figure 7:
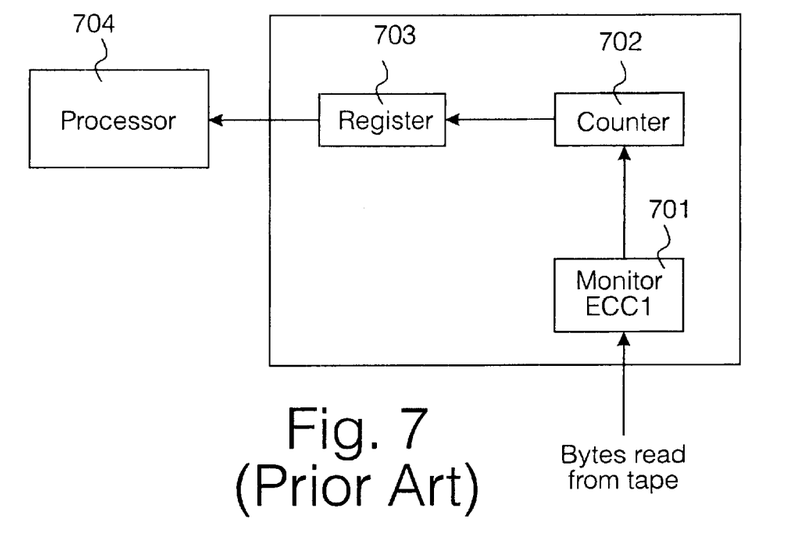
FIG. 7 illustrates schematically a prior art apparatus for counting the number of incorrectly written fragments in a track.

Referring to FIG. 7 herein there is illustrated schematically a prior art method for monitoring quality of data written to magnetic tape. During a write operation a write head writes a track of data, comprising 96 fragments each containing an interleaved ECC1 codeword pair, in a diagonal stripe across the magnetic tape and, after a period of time of the order 16 ms, a read head reads data back from the magnetic tape. ECC1 monitoring means 701 monitors the ECC1 parity bytes associated with each codeword pair. If the ECC1 parity bytes containing redundant information concerning either of the interleaved codewords within one fragment indicate that the data contained within either codeword of the interleaved codeword pair is not corrupted then the fragment is considered to be 'good' and counter 702 is incremented. The total number of good fragments which are counted by counter 702 is stored within a register 703. The contents of register 703 are transferred to processor 704 which controls the writing process. If the total number of good fragments within one track are less than a predetermined threshold value then the processor acts to rewrite the track to magnetic tape. The processor may be a microprocessor operating according to instructions contained within a program stored within the microprocessor.

A problem with the above prior art method is that the value of the predetermined threshold level of good fragments is critical to the efficiency of the use of the storage capacity of the tape. If the predetermined threshold value is set too high then this results in too many tracks being rewritten to the magnetic tape resulting in a inefficient use of the total data storage capacity of the magnetic tape. However, setting the predetermined threshold value too low results in tracks which may have too many errors to be recoverable not being rewritten to tape and as a result data may be lost.

Figure 8:
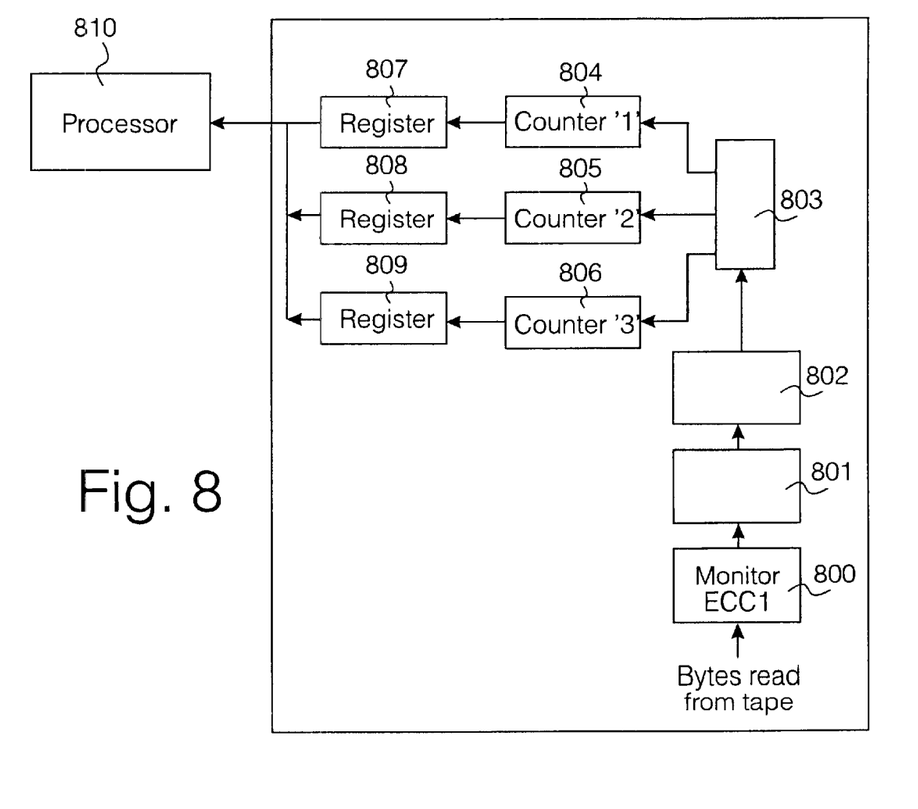
FIG. 8 illustrates schematically an apparatus for counting the number of incorrectly written fragments of a track according to a specific embodiment of the present invention.

Referring to FIG. 8, there is illustrated schematically an improved means for monitoring the quality of data written to magnetic tape according to the best mode presented herein. ECC1 monitoring means 800 determines whether either of the interleaved ECC1 codewords within a single fragment read from the magnetic tape are good and hence whether the fragment as a whole is good. There is provided a means 801 for examining the header field 420 and obtaining the number of a good fragment within a track. The fragment number of a good fragment found by header examining means 801 is input into means 802 for allocating one of a plurality of first to third counters 804 to 806 to count the good fragment dependant upon the number of the good fragment within the track. Counter selection means 803 selects one of a plurality of counters 804 to 806 and increment one of the plurality of counters 804 to 806 identified by block 802. Each counter 804 to 806 outputs to a corresponding respective register 807 to 809. Registers 807 to 809 store the outputs of counters 804 to 806 in a form which can be readily transferred to the processor 810. If the total number of good fragments stored in any of the registers 807, 808 or 809 lies below a predetermined threshold value then processor 810 acts to rewrite the data track to the magnetic tape.

The first to third counters 804–806 count the number of good fragments within each of three groups of ECC2 codewords. By way of example, the first counter 804 counts the number of good fragments within the column which includes fragments 500 and 525. First counter 804 counts the number of good fragments among the zeroth fragment and every third fragment thereafter of the track. Second counter 805 counts the number of good fragments among the first fragment and every third fragment thereafter of the track and third counter 806 counts the number of good fragments among the second fragment and every third fragment thereafter of the track. Referring to Table 2 herein, there is summarised the allocation of fragment number to the first to third counters 804 to 806.

TABLE 2

|  | Counter '1' | Counter '2' | Counter '3' |
|---|---|---|---|
| Fragment Number | 0 | 1 | 2 |
|  | 3 | 4 | 5 |
|  | 6 | 7 | 8 |
|  | 9 | 10 | 11 |
|  | . | . | . |
|  | . | . | . |
|  | . | . | . |
|  | 93 | 94 | 95 |

Any particular ECC2 error correction can cope with a fixed maximum number of 'bad fragments'. The process of arranging the fragments of a track into three columns prior to adding ECC2 error correction bytes results in three separate sets of EEC2 codewords. Prior art error correction methods require that a track is rewritten to magnetic tape if the total number of bad fragments within the track exceeds a predetermined threshold value. However, according to the best mode described herein, by using three counters (or any other suitable number of counters) to record which of the three groups (or other suitable number) of EEC2 codes words a bad fragment falls within then a track need only be repeated if the total number of bad fragments within at least one of the three groups of EEC2 codewords exceeds a same predetermined threshold level. This may have the effect of making the data storage device described herein of the order of three times more tolerant to write errors than the prior art method. Increasing the tolerance to errors and hence reducing the number of tracks that are rewritten to tape yields a significant increase in the amount of data that can be stored on the magnetic tape.

Figure 9:
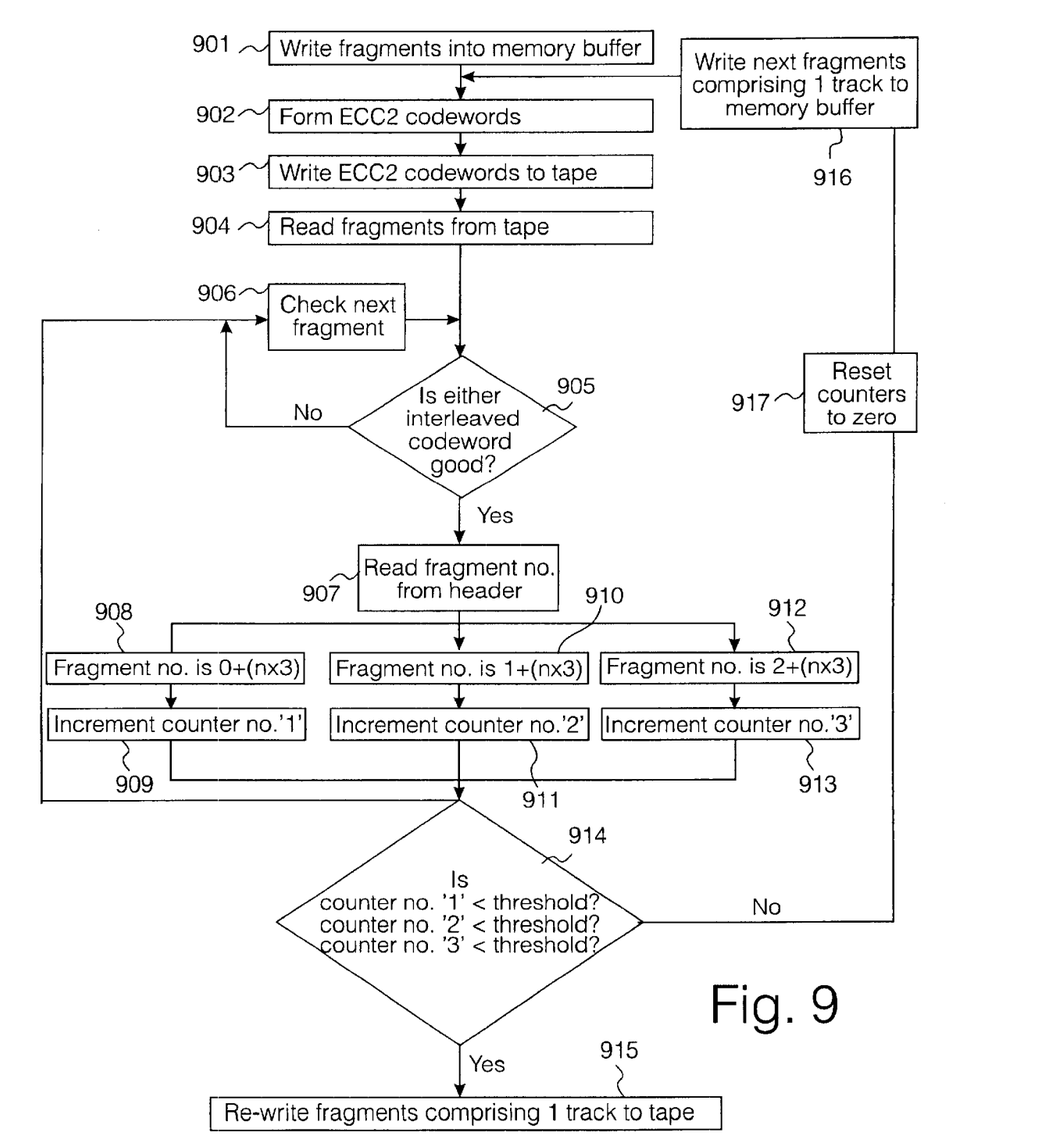
FIG. 9 illustrates schematically a method for counting the number of incorrectly written fragments within a track according to a specific method of the present invention.

Referring the FIG. 9 herein, there is illustrated schematically a method for determining whether or not to rewrite a track to a magnetic tape. In step 901, the ninety six fragments comprising one track are written into a memory buffer. In step 902, ECC2 codewords are formed by taking, for example, a first byte from a zeroth fragment and a first byte from every third fragment thereafter. In step 903, the fragments including data, EEC1 and EEC2 parity bytes are written to tape. In step 904, the fragments comprising one track are read back from magnetic tape. In step 905 a fragment is checked to determine whether the data is recoverable or not by checking the interleaved ECC1 codeword associated with each fragment. If the fragment has been corrupted during a writing process then in step 906 the interleaved ECC1 codewords associated with the next fragment are checked. However, if the fragment is good then in step 907 the number of the fragment within the track is read from the fragment header. If the fragment number defined by the equation $$\text{fragment number} = 0 + (N \times 3),$$

where N=1, . . . , 31, then in step 909 first counter '1' is incremented. If, in step 910, the fragment number is defined by the equation $$\text{fragment number} = 1 + (N \times 3),$$

where N=0, . . . , 31, then in step 911 second counter '2' is incremented by 1. In step 912, if the fragment number is defined by the equation $$\text{fragment number} = 2 + (N \times 3),$$

where N=0, . . . , 31, then in step 913 third counter '3' is incremented by 1. In step 906 the next fragment is checked. In the above equations, the symbol "N" represents the contiguous series of integers in the range 0 to 31. It is not always the case that all fragments in a track can be detected by the tape drive, before reaching the end of a track, due, for example, to parity errors in the header. However, once all of the fragments comprising one track which are detectable by the read heads have been read, and the total number of good fragments have been recorded on first counter '1', second counter '2' and third counter '3' then if the total number of good fragments recorded in any of the counters is less than a predetermined threshold value then in step 915 the track is rewritten to tape. However, if the number of good fragments in all of the counters lies above a predetermined threshold value then in step 917 the counters are reset to zero and in step 916 the next set of fragments comprising one track are written into the memory buffer.

What is claimed is:

1. A method of writing a stream of digital data to a data storage medium, comprising:
   partitioning said stream of digital data into a plurality of fragments;
   interleaving an error correction code between individual ones of said fragments; and
   partitioning a plurality of said fragments together into a plurality of groups of fragments, a grouping of said groups being determined according to said interleave.

2. The method as claimed in claim 1, wherein each of said plurality of fragments contain a same number of bits of data as each other.

3. A method for writing a stream of digital data to a data storage medium using a data storage device comprising:
   partitioning said stream of digital data into a plurality of fragments;
   writing said plurality of fragments to said data storage medium;
   reading said plurality of fragments from said data storage medium;
   checking whether each of said read fragments are correct;
   assigning each of said correct read fragments to only one of a plurality of groups of fragments;
   counting a total number of correct read fragments within each of said plurality of groups of fragments; and
   if said total number of correct read fragments within any of said plurality of groups of fragments is less than a threshold number of correct read fragments, then repeating said step of writing said plurality of fragments to said data storage medium.

4. A method as claimed in claim 3, wherein said plurality of fragments contain a same number of bits of data.

5. A method as claimed in claim 3, wherein said plurality of fragments contains a first number of bits of data for correcting errors in said fragments.

6. A method as claimed in claim 3, wherein said plurality of fragments contain a second number of bits of data for correcting errors in said fragments.

7. A method as claimed in claim 3, wherein said first number of bits of data for correcting errors in said fragments are a Reed-Solomon cyclic redundancy code.

8. A method as claimed in claim 3, wherein said second number of bits of data for correcting errors in said fragments are a Reed-Solomon cyclic redundancy code.

9. A method as claimed in claim 3, wherein said step of assigning each of said correct read fragments of only one of a plurality of groups of fragments, further comprises:
   determining a number of a correct read fragment within said plurality of groups of fragments;
   if said number of said correct said read fragments is defined by a first equation, then said correct read fragment is assigned to a first group of fragments;
   if said number of said correct said read fragments is defined by a second equation, then said correct read fragment is assigned to a second group of fragments; and
   if said number of said correct read fragments is defined by a third equation, then said correct word fragment is assigned to a third group of fragments.

10. A method as claimed in claim 9, wherein said first equation is:

$$\text{fragment number} = 0 + (N \times 3),$$

where N is an integer number and may take any value in a contiguous range of integer numbers from 0 to 31.

11. A method as claimed in claim 9, wherein said second equation is:

$$\text{fragment number} = 1 + (N \times 3),$$

where N is an integer number and may take any value in a contiguous range of integer numbers from 0 to 31.

12. A method as claimed in claim 9, wherein said third equation is;

$$\text{fragment number} = 2 + (N \times 3),$$

where N is an integer number and may take any value in a contiguous range of integer numbers from 0 to 31.

13. A method as claimed in claim 3, wherein said data storage medium comprises a magnetic disk.

14. A method as claimed in claim 3, wherein said data storage medium comprises a magnetic tape.

15. A data storage device for writing a stream of data to a data storage medium comprising:
   a means for partitioning said stream of data into a plurality of fragments;
   a means for writing said plurality of fragments to said data storage medium;
   a means for reading said plurality of fragments from said data storage medium;
   a means for identifying correct fragments;
   a means for identifying a position of said correct read fragments within said plurality of fragments;
   a means for assigning said correct read fragments to only one group of a plurality of groups of fragments;
   a plurality of means for counting a number of said correct read fragments;
   a means for causing said plurality of fragments to be re-written to said data storage medium if said number of said correct read fragments within any of said plurality of groups of fragments is less than a threshold number of correct read fragments.

16. A data storage device as claimed in claim 15, wherein said means for causing said plurality of fragments to be re-written to said data storage medium comprises a microprocessor.

17. A data storage device as claimed in claim 15 wherein said data storage medium comprises a magnetic tape.

* * * * *